United States Patent [19]

Ho et al.

[11] Patent Number: 4,786,778

[45] Date of Patent: Nov. 22, 1988

[54] ELECTRICAL DISCHARGE MACHINING FINE FINISH CIRCUIT WITH SYMMETRICAL WAVEFORM IN BOTH POLARITIES

[76] Inventors: Kuang-Ta Ho, 7202 Quail Meadow La., Charlotte, N.C. 28210; Randall C. Gilleland, 1029 Dellinger Dr., Statesville, N.C. 28073

[21] Appl. No.: 901,958

[22] Filed: Aug. 29, 1986

[51] Int. Cl.[4] ............................................. B23H 1/02
[52] U.S. Cl. .............................. 219/69 P; 219/69 C; 363/134
[58] Field of Search ............... 219/69 S, 69 C, 69 P; 363/133, 134

[56] References Cited

U.S. PATENT DOCUMENTS

| | | | |
|---|---|---|---|
| 3,558,998 | 1/1971 | Bertolasi | 219/69 C |
| 3,654,116 | 4/1972 | Inoue | 204/224 M |
| 3,732,392 | 5/1973 | Verner | 219/69 S |
| 3,851,134 | 11/1974 | Takarada | 219/69 S |
| 4,071,729 | 1/1978 | Bell, Jr. | 219/69 C |
| 4,303,957 | 12/1981 | Bell, Jr. et al. | 219/69 S |
| 4,310,741 | 1/1982 | Inoue | 219/69 C |
| 4,347,425 | 8/1982 | Obara | 219/69 P |
| 4,361,745 | 11/1982 | Rupert et al. | 219/69 C |
| 4,654,497 | 3/1987 | Obara | 219/69 C |
| 4,678,884 | 7/1987 | Obara et al. | 219/69 C |

FOREIGN PATENT DOCUMENTS 8504353  10/1985  PCT Int'l Appl. ............... 219/69 C

*Primary Examiner*—A. D. Pellinen
*Assistant Examiner*—Geoffrey S. Evans

[57] ABSTRACT

An EDM machining circuit which is operable at negative polarity and at positive polarity. A push pull circuit is included to provide a symmetrical waveform with either polarity. Switching control of the main switching transistor is provided through a microprocessor.

7 Claims, 1 Drawing Sheet

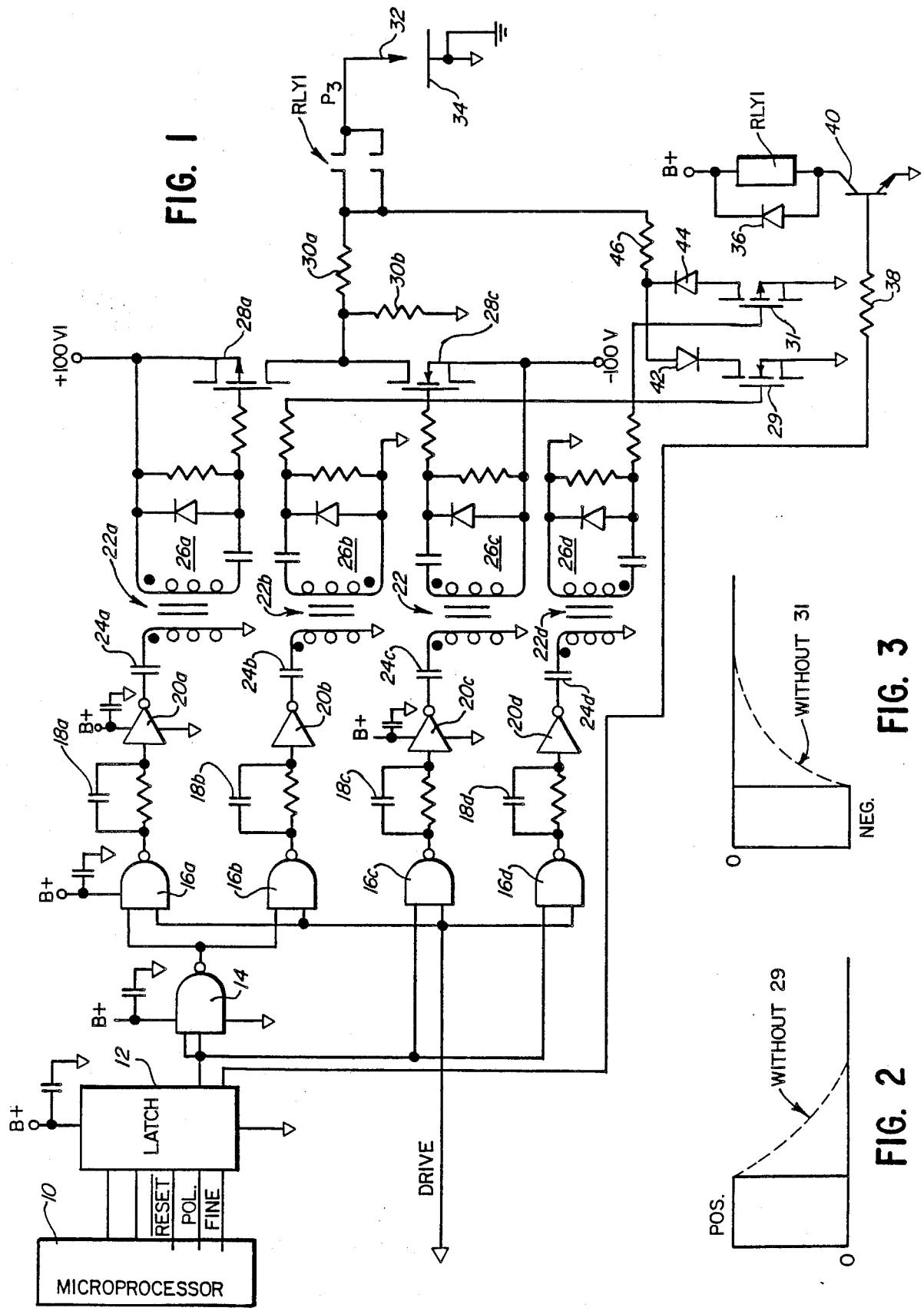

4,786,778

ELECTRICAL DISCHARGE MACHINING FINE FINISH CIRCUIT WITH SYMMETRICAL WAVEFORM IN BOTH POLARITIES

BACKGROUND OF THE INVENTION

The field to which the present invention relates is that generally known as electrical discharge machining sometimes hereinafter referred to as EDM in which a material is removed from an electrically conductive workpiece by the action of electrical gap discharges occurring between a tool electrode and the workpiece. A dielectric coolant fluid is circulated and recirculated through the gap, usually under pressure, throughout the machining operation. An electrode or a workpiece servo feed system is used to provide relative movement and thus maintain an optimum gap spacing between the electrode and the workpiece as the workpiece material is being removed.

In standard polarity, a negative voltage is applied to the electrode. In reverse polarity, a negative voltage is applied to the workpiece. Because of the large amount of capacitance in the EDM gap circuit, the positive and negative polarity setups differ greatly. We may have a good waveform at negative polarity and a much worse waveform at positive polarity, or vice versa. Especially during the fine finish cut, as the on-time or off-time becomes shorter, the waveform becomes worse. In order to make the waveform symmetric for both polarities, I have found that it is desireable to incorporate a push-pull circuit with the main switching transistor connected to the gap.

It is also possible to control the operation and the changeover between roughing and finishing at the different polarities by means of a programmable computer, microprocessor or similar input device. One type of electrical discharge machining power supply system operable with inputs from a programmable computer is shown in Oliver A. Bell, Jr. U.S. Pat. No. 4,071,729 issued on Jan. 31, 1978 for "ADAPTIVE CONTROL SYSTEM AND METHOD FOR ELECTRICAL DISCHARGE MACHINING". This patent is of common ownership with the present application.

SUMMARY OF THE INVENTION

Our invention will be shown to provide an EDM pulse control system allowing for operations at both gap polarities. Inclusion of a push-pull type main switching transistor allows for symmetrical gap voltage pulses at both polarities. Thus it is possible to provide a roughing operation at any polarity and change over to a fine finishing operation with a symmetrical waveform for both.

BRIEF DESCRIPTION OF THE DRAWINGS

The present invention, its operation, features and advantages and the advancements which it affords will be understood from the following specification together with the drawings in which like numerals are used to refer to similar or like parts where they occur and in which:

FIG. 1 is a partly diagrammatic schematic showing of the circuitry involved;

FIG. 2 is a gap voltage waveform as it occurs at positive polarity cutting;

FIG. 3 is a gap voltage waveform as it occurs during negative polarity cutting.

DETAILED DESCRIPTION OF THE PREFERRED EMBODIMENT

In FIG. 1 there is shown a box 10 at the lefthand side of the drawing which represents a microprocessor that controls all the different EDM operations. A number of control signals are provided from the microprocessor 10 which include a reset signal, a polarity signal and a fine finish signal. Also shown is a drive signal which is provided from the microprocessor 10. A latch 12 is connected in circuit as shown. The latch 12 is further coupled to a suitable B +operating source. A nandgate 14 is connected in circuit to receive the polarity output from the latch 12. Next following in the circuit in each of the branches are four nandgates 16a, 16b, 16c and 16d which function to control which of the transistors in the gap circuit will be operated. An RC network 18a, 18b, 18c and 18d is then connected in each of the four circuits in series with the input terminal of inverters 20a, 20b, 20c and 20d, respectively. Next following the inverters are a plurality of pulse transformers 22a, 22b, 22c and 22d as shown. DC isolation capacitors 24a, 24b, 24c and 24d are further coupled in the four branches as shown.

The upper branch includes a DC restoration circuit 26a while corresponding DC restoration circuits 26b, 26c and 26d are included in each of the respective remaining branches. the right hand side of the drawing there is shown the upper main switching transistor embodied as a HEXFET 28a. A second HEXFET 28c is shown below it in the drawing. The HEXFET 28a has its upper terminal connected to a plus 100 voltage power source. HEXFED 28c and 28a are connected and operable in push pull relationship. The lower HEXFET 28c has connected to it a minus 100 voltage source. The output of the HEXFET 28a is passed through a divider including resistors 30a and 30b. A pair of open contacts associated with a relay RLY 1 are connected in series between the output of the HEXFETS 28a and 28c and the machining gap which includes the electrode 32 and the workpiece 34. Opening or closing of the contacts for RLY 1 is controlled by the coil of RLY 1 as shown at the right hand corner of the drawing. The RLY 1 in turn is connected to a source of positive operating voltage and shunted by a protective diode 36. Operation of the RLY 1 coil is initiated by an output from the latch 12 with the triggering signal passed through a resistor 38 to the base of a transistor 40 that in turn controls the activation of the RLY 1. In the second branch from the top, there is further included a HEXFET 29 which is connected through a diode 42 and a series resistor 46 to the terminal of the resistor 30a and to the end of the relay contact of RLY 1. There is also included a second HEXFET 31 which has its terminal connected through a diode 44 and a series resistor 46 to the righthand terminal of the resistor 30a and further to the relay contact shown for RLY 1.

DESCRIPTION OF OPERATION

The inputs to the circuit include a drive signal input, a polarity input and an input related to the fine finish operation. The latch 12 will latch on the output until a reset signal is received. The nandgates 16a and 16b operate in the positive polarity mode. When the negative polarity is needed, then the drive signal only appears on the lower two nandgates 16c and 16d. The main switching transistor for the positive polarity operation is the HEXFET 28a. The main switching transistor for the negative operation is the HEXFET 28c. Whichever of the two polarities is selected depends on the operation of the gate 14.

FIG. 2 shows the gap voltage waveform in the positive polarity operation with the dashed lines indicating a non-desireable waveform in which there is variance of pulse on-time and off-time and no symmetry between the negative operation waveform. Inclusion of the second HEXFET 29 in the circuit will provide the squared off waveform that is desired. In FIG. 3, operation in the negative polarity mode is shown with and without the HEXFET 31 in the circuit.

As shown in FIG. 1, transistor 28a is a P-channel type which its source connected to the positive side of a power supply. Consequently, when transistor 28a is on, its gate control potential must be negative relative to its source. Also, as shown in FIG. 1, transistor 29 is an N-channel type with its source connected to circuit ground. For transistor 29 to be on, its gate control potential must be positive relative to its source. However, since the gate control potentials for transistors 28a and 29 are simultaneous and of the same polarity relative to their respective sources, on of them must be off while the other is on.

Likewise, as shown in FIG. 1, transistor 28c is an N-channel type and transistor 31 is a P-channel type. Transistor 28 has its source connected to the negative side of a power supply and therefore requires a positive gate control potential relative to its source to be turned on. Transistor 31 has its source connected to ground, and must therefore must has a negative gate control potential relative to its source to be turned on. Since the gate control potentials for transistors 28c and 31 are simultaneous, and of the same polarity relative to their respective sources, one of them must be off while other is on.

It is therefore evident from FIG. 1 that transistor 29 turns on when transistor 28a turns off, and that transistor 31 turns on when transistor 28c turns off.

It is also evident from FIG. 1 that even though transistor 29 is turned on while transistor 28c is turned on, transistor 29 cannot discharge the negative potential applied to the input contacts of relay RLY 1 because the polarity of diode 42 blocks such current flow.

Likewise, FIG. 1 shows that even though transistor 31 is turned on while transistor 28a is turned on, transistor 31 cannot discharge the positive potential applied to the input contacts of relay RLY 1 because the polarity of diode 44 blocks such current flow.

Consequently, it is clear that transistor 29 can only serve to discharge positive potential from the contacts of relay RLY 1 after transistor 28a turns off. Positive potential may remain after transistor 28a turns off due to the above described capacitance in the EDM gap circuit, which is typically stray capacitance. The rapid discharge provided transistor 31 turns on prevents such remnant positive potential. This improvement is illustrated in FIG. 2.

Likewise, it is clear that transistor 31 can only serve to discharge negative potential from the input contacts of relay RLY 1 after transistor 28c turns off. Negative potential which remains on the line due to the above described capacitance effects is immediately discharged as transistor 31 turns on. This improvement is illustrated in FIG. 3.

The symmetry of voltage waveforms is related to the push-pull electronic main switching transistors. The switchover between one polarity and the other is handled in a straightforward manner under microprocessor control.

It will thus be seen that we have provided by our invention an EDM power supply circuit that provides for electrical discharge machining power pulses of symmetrical waveform in both polarities.

We claim:

1. An electrical discharge machining circuit operable with the machining gap at one polarity for roughing operation and at the other polarity for finishing operation, comprising:
   a first swtiching transistor operated to connect machining power power pulses of one polarity to the gap;
   a second main switching transistor connected in push-pull to said first switching transistor and operated to connect machining power pulses of the other polarity to the gap;
   a separate opposite poled transistor connected to each of the main switching transistors and to the gap and operated along therewith, and
   gating means operativley connected to each of the aforesaid transistors for initiating their alternate roughing and finishing operation.

2. The combination as set forth in claim 1 in which said switching transistors are each connected between a different polarity DC source and the gap.

3. The combination as set forth in claim 1 in which said gating means are connected to the outputs of a micro-processor for programmed control.

4. The combination as set forth in claim 3 in which a latch is connected intermediate said outputs and said gating means for controlling changeover between gap polarity.

5. The combination as set forth in claim 4 in which a relay is operably connected between said latch and the gap controlling the connection of the power supply to the gap.

6. The combination as set forth in claim 1 in which a pulse transformer is connected in series between said gating means and the control gate of each of said transistors, respectively.

7. The combination as set forth in claim 3 in which said gating means comprises a plurality of nandgates, each operably connected between said microprocessor outputs and a respective one of said transistors.

* * * * *